United States Patent
Tu et al.

(10) Patent No.: US 8,538,022 B2
(45) Date of Patent: Sep. 17, 2013

(54) SYSTEM AND METHOD OF CROSS-COMPONENT MESSAGE PROCESSING

(75) Inventors: Van Quy Tu, Kitchener (CA); Neil Patrick Adams, Kitchener (CA)

(73) Assignee: BlackBerry Limited, Waterloo (CA)

( * ) Notice: Subject to any disclaimer, the term of this patent is extended or adjusted under 35 U.S.C. 154(b) by 791 days.

(21) Appl. No.: 12/478,243

(22) Filed: Jun. 4, 2009

(65) Prior Publication Data
US 2010/0310073 A1 Dec. 9, 2010

(51) Int. Cl.
*H04K 1/00* (2006.01)
*H04W 12/02* (2009.01)

(52) U.S. Cl.
CPC ..................................... *H04W 12/02* (2013.01)
USPC ......................................................... 380/270

(58) Field of Classification Search
USPC .......................... 709/235; 380/270; 713/176
See application file for complete search history.

(56) References Cited

U.S. PATENT DOCUMENTS

| | | | |
|---|---|---|---|
| 5,764,899 A | 6/1998 | Eggleston et al. | |
| 6,134,582 A | 10/2000 | Kennedy | |
| 6,289,105 B1 | 9/2001 | Murota | |
| 2004/0090457 A1* | 5/2004 | Serdy et al. | 345/752 |
| 2004/0186990 A1 | 9/2004 | Lai et al. | |
| 2004/0205330 A1 | 10/2004 | Godfrey et al. | |
| 2005/0038863 A1* | 2/2005 | Onyon et al. | 709/207 |
| 2005/0114670 A1* | 5/2005 | Bowe et al. | 713/180 |
| 2006/0031299 A1 | 2/2006 | Robertson | |
| 2006/0036865 A1 | 2/2006 | Brown et al. | |
| 2006/0085509 A1 | 4/2006 | Wener | |
| 2008/0109462 A1* | 5/2008 | Adams et al. | 707/101 |
| 2009/0034729 A1 | 2/2009 | Brown et al. | |
| 2010/0174761 A1* | 7/2010 | Longobardi et al. | 707/809 |

FOREIGN PATENT DOCUMENTS

| | | |
|---|---|---|
| EP | 2381998 A | 5/2003 |
| EP | 1420554 A | 5/2004 |
| EP | 1420554 A1 | 5/2004 |
| EP | 1919084 A1 | 5/2008 |
| EP | 2020789 A1 | 2/2009 |
| WO | 2005107140 A1 | 11/2005 |

OTHER PUBLICATIONS

Murphy, Galvin S. et al. "Security Multiparts for MIME: Multipart/Signed and Multipart/Encrypted; rfc1847.txt". Oct. 1995, IETF Standard, Internet Engineering Task Force, IETF, CH XP015007632. ISSN: 0000-0003.
Extended European Search Report relating to application No. 09161927.0, dated Nov. 8, 2010.

* cited by examiner

*Primary Examiner* — Peter Shaw
(74) *Attorney, Agent, or Firm* — Ridout & Maybee LLP

(57) ABSTRACT

Often, for reasons of wireless bandwidth conservation, incomplete messages are provided to wireless messaging devices. Employing cryptography, for secrecy or authentication purposes, when including a received message that has been incompletely received can lead to lack of context on the receiver's end. By automatically obtaining the entirety of the message to be included, an outgoing message that includes the received message can be processed in a manner that securely and accurately represents the intended outgoing message.

4 Claims, 9 Drawing Sheets

SYSTEM AND METHOD OF CROSS-COMPONENT MESSAGE PROCESSING

FIELD OF THE INVENTION

The present application relates generally to mobile wireless electronic messaging and, more specifically, to processing a message with the involvement of more than one component.

BACKGROUND OF THE INVENTION

In one manner of processing (e.g., signing) an outgoing e-mail message, a communication application, employed by a given user, generates a hash (also called a "digest") of the outgoing e-mail message and encrypts the hash of the outgoing e-mail message using a private key half of a public-private key pair. The encrypted hash of the outgoing e-mail message may then be transmitted along with the outgoing e-mail message as a signature. Upon receiving the e-mail message, the recipient may be provided with a degree of certainty that the received e-mail message originated with the given user by generating a hash of the e-mail message, decrypting the signature using a public key half of the public-private key pair and finding that the hash of the e-mail message matches the result of the decrypting.

BRIEF DESCRIPTION OF THE DRAWINGS

Reference will now be made to the drawings, which show by way of example, embodiments of the invention, and in which.

DETAILED DESCRIPTION OF THE EMBODIMENTS

Figure 1:
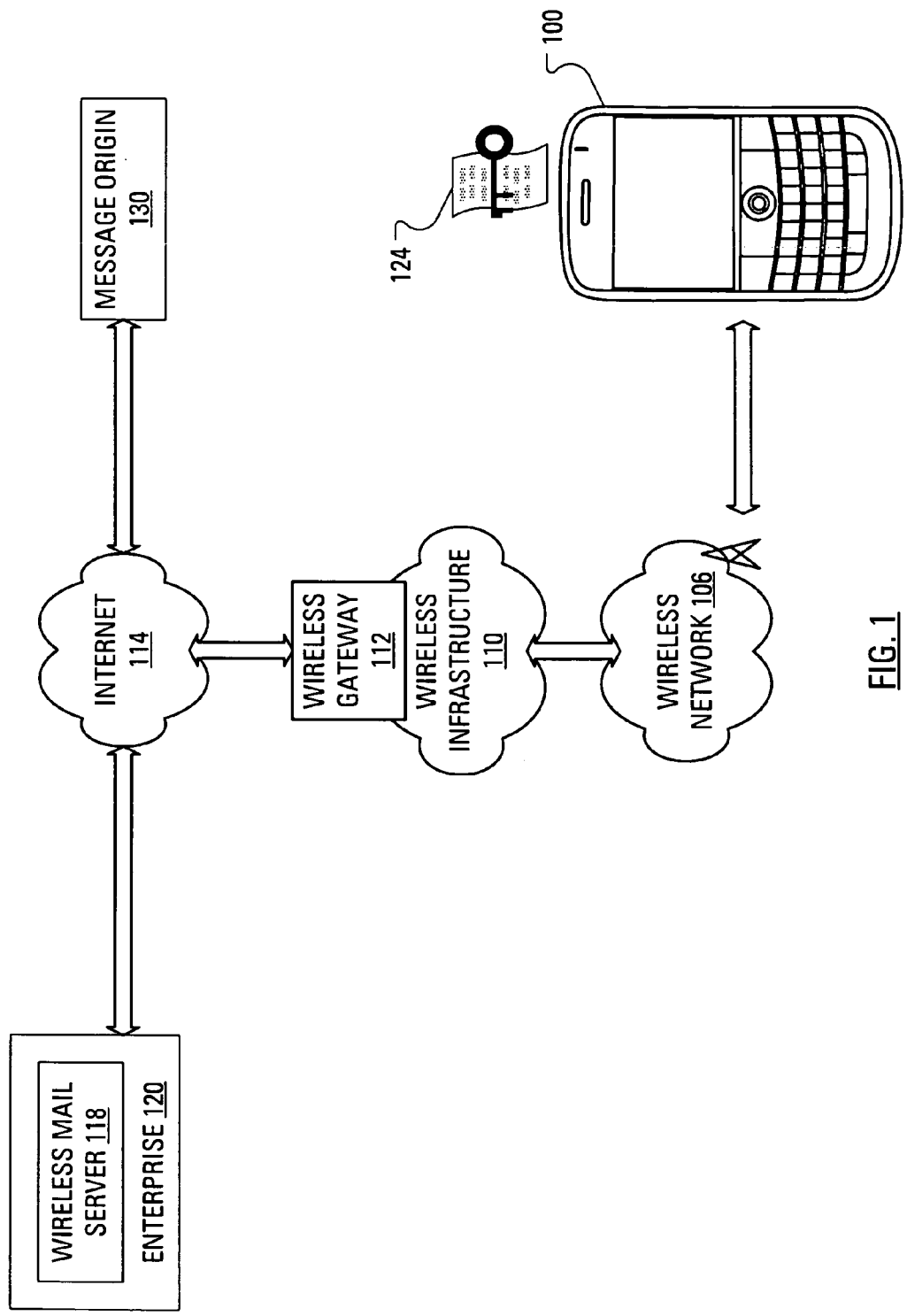
FIG. 1 illustrates an overview of an example system including a mobile communication device and a wireless mail server.

When a mobile wireless device is used to receive and transmit e-mail, the mobile wireless device is often associated with a mobile mail server. The mobile mail server manages the transmission of messages to the mobile wireless device to optimize use of the limited resources of a wireless communication channel in the path between the mobile wireless device and the mobile mail server. The mobile mail server may also manage messages transmitted by the mobile wireless device to optimize in a similar fashion.

For a first example of optimization of transmission of messages to the mobile wireless device, by only transmitting an initial portion of a first e-mail message to the mobile wireless device, the mobile mail server may conserve wireless resources that would otherwise be consumed by transmitting the entire first e-mail message.

It is common, in e-mail communication applications, to include the text of a received e-mail message when composing an e-mail message in response. However, in a mobile communication system, when sending a responsive e-mail message, the mobile wireless device may only be able to include the initial portion of the received e-mail message in the responsive e-mail message, since the mobile wireless device may only have the initial portion of the received e-mail message available. Upon receiving the responsive e-mail message, the cleverly designed mobile mail server may append the remaining (i.e., non-initial) portion of the e-mail message to which the responsive e-mail message is replying before forwarding the entire responsive e-mail message toward its destination. Conveniently, this scheme conserves wireless communication channel resources.

However, when a user of the mobile wireless device wishes to sign an e-mail message that is responsive to a received e-mail message, obtaining the efficiency of previously described schemes becomes challenging.

For example, consider receipt, at the mobile wireless device, of an initial portion of a first e-mail message. The user of the mobile wireless device reviews the initial portion of the first e-mail message and composes a response to the first e-mail message. The response may be considered a second e-mail message. The second e-mail message may be considered to have at least two portions: an "old" portion, comprising the initial portion of the first e-mail message; and a "new" portion, comprising the content composed by the user of the mobile wireless device. The user of the mobile wireless device may decide to sign the second e-mail message. Accordingly, when obtaining a signature to associate with the second e-mail message, the mobile wireless device may only obtain a hash of the second e-mail message (i.e., the old portion appended to the new portion). That is, the mobile wireless device encrypts a hash of the second e-mail message with the private key stored at the mobile wireless device. The mobile mail server would normally append the remaining (i.e., non-initial) portion of the first e-mail message to the received second e-mail message to form a complete response, before forwarding the complete response to the origin of the first e-mail message. However, since the signature received in association with the second e-mail message only relates to the old portion appended to the new portion, and not to the complete response, the mobile mail server must simply forward the second e-mail message and associated signature toward the origin of the first e-mail message.

At the origin of the first e-mail message, the recipient of the second e-mail message does not receive all of the typically appended first e-mail message content and, accordingly, may struggle with the placing of the second e-mail message properly in context.

To provide awareness to the sender of the second e-mail message (i.e., the user of the mobile wireless device) that the second e-mail message will include only a truncated version of the first e-mail message, the mobile wireless device may display a warning dialog. The warning dialog may be displayed responsive to the user of the mobile wireless device indicating, using a user interface in a message composition mode, that the second e-mail message is to be sent. The warning dialog may indicate "Warning! Your message will be truncated." Furthermore, the warning dialog may be interactive and may require user selection of a choice before the warning dialog may be dismissed from the display. That is, the warning dialog may present choices labeled "OK" and "Cancel". Additionally, the warning dialog may include a checkbox labeled "Don't show this dialog again". The user may select the "OK" choice to indicate acceptance of the truncation. Alternatively, the user may select the "Cancel" choice to indicate a wish to return to composing the message. By selecting the checkbox labeled "Don't show this dialog again" and then selecting the "OK" choice, the user may effectively set a policy for the mobile wireless device, where the policy indicates that all future signed, and/or encrypted, messages are to include only a truncated version of the original received message.

Upon receiving an indication that the user has selected the "OK" choice, the mobile wireless device may proceed to transmit the second e-mail message to the mobile mail server for forwarding to the sender of the first e-mail message.

Upon receiving an indication that the user has selected the "Cancel" choice, the mobile wireless device may return the user interface to the message composition mode. Responsive to being returned to the message composition mode, the user may manipulate the user interface to copy, to a clipboard, the message that has been typed (i.e., the new portion). The user may then close the message composition user interface, return to a message list and re-open the first message. Once the initial portion of the first message is open, the user may manipulate a message viewing user interface to request, from the mobile mail server, the entire first message. The user may then manipulate the message viewing user interface to indicate a wish to compose a response to the first message. Once the message composition user interface has been opened, pre-loaded with the entirety of the first e-mail message, the user may paste the previously composed new portion from the clipboard to the message composition area in the message composition user interface, thereby creating a third e-mail message. The third e-mail message may be distinguished from the second e-mail message in that the third e-mail message includes the entirety of the first e-mail message and the second e-mail message only includes a truncated version of the first e-mail message. The user may then create a signature for the third e-mail message and indicate that the third e-mail message and the signature are to be sent.

One can see that including an entire original message in a signed response can require manually carrying out some potentially tedious and complex steps.

By arranging automatic downloading of entire messages responsive to inclusion of such messages in outgoing messages for which processing is requested, much operation complexity on the part of the user can be obviated.

In an aspect of the present disclosure there is provided a method of processing an electronic message at a mobile wireless communication device. The method includes detecting receipt of an instruction to process a response message, where the response message includes a new portion and a truncated portion of a preceding message, obtaining a remainder of the preceding message, thereby allowing formation of a complete preceding message, forming a new message from the new portion and the complete preceding message and processing the new message. In other aspects of the present application, a mobile wireless communication device is provided for carrying out this method and a computer readable medium is provided for adapting a processor to carry out this method.

Other aspects and features of the present invention will become apparent to those of ordinary skill in the art upon review of the following description of specific embodiments of the invention in conjunction with the accompanying figures.

Referring to FIG. 1, an overview of an example system for use with the embodiments described below is shown. One skilled in the art will appreciate that there may be many different topologies, but the system shown in FIG. 1 helps demonstrate the operation of the systems and methods described in the present application. For example, there may be many mobile communication devices connected to the system that are not shown in the overview of FIG. 1.

FIG. 1 shows a mobile wireless device in the form of a mobile communication device 100. It will be appreciated by those skilled in the art that the mobile communication device 100 may comprise any computing or communication device that is capable of connecting to a network by wireless means, including, but not limited, to personal computers (including tablet and laptop computers), personal digital assistants, smart phones, and the like. It will further be appreciated by those skilled in the art that these devices may be referred to herein as computing devices or communication devices, and may have principal functions directed to data or voice communication over a network, data storage or data processing, or the operation of personal or productivity applications; those skilled in the art will appreciate that terminology such as "mobile device", "communication device", "computing device", or "user device" may be used interchangeably.

The mobile communication device 100 may, for example, be connected to an Internet Service Provider on which a user of the system of FIG. 1, likely the user associated with the mobile communication device 100 illustrated in FIG. 1, has an account.

The mobile communication device 100 may be capable of sending and receiving messages and other data via wireless transmission and reception, as is typically done using electromagnetic waves in the radio frequency (RF) spectrum. The exchange of messages and other data may occur, for instance, between the mobile communication device 100 and a base station in a wireless network 106. The mobile communication device 100 may receive data by other means, for example through a direct connection to a port provided on the mobile communication device 100. An example of such a direct connection is a Universal Serial Bus (USB) link.

As illustrated in FIG. 1, the wireless network 106 connects to a wide area network 114, represented as the Internet, via a wireless infrastructure 110. The wireless infrastructure 110 incorporates a wireless gateway 112 for connecting to the Internet 114.

A connection between the mobile communication device 100 and the Internet 114 allows the mobile communication device 100 to access a wireless mail server 118. The wireless mail server 118 may be grouped together with other servers in an enterprise 120. Also connected to the Internet 114 may be a representative message origin 130. The mobile communication device 100 may store a private cryptographic key 124 that is associated with a corresponding public cryptographic key.

Figure 2:
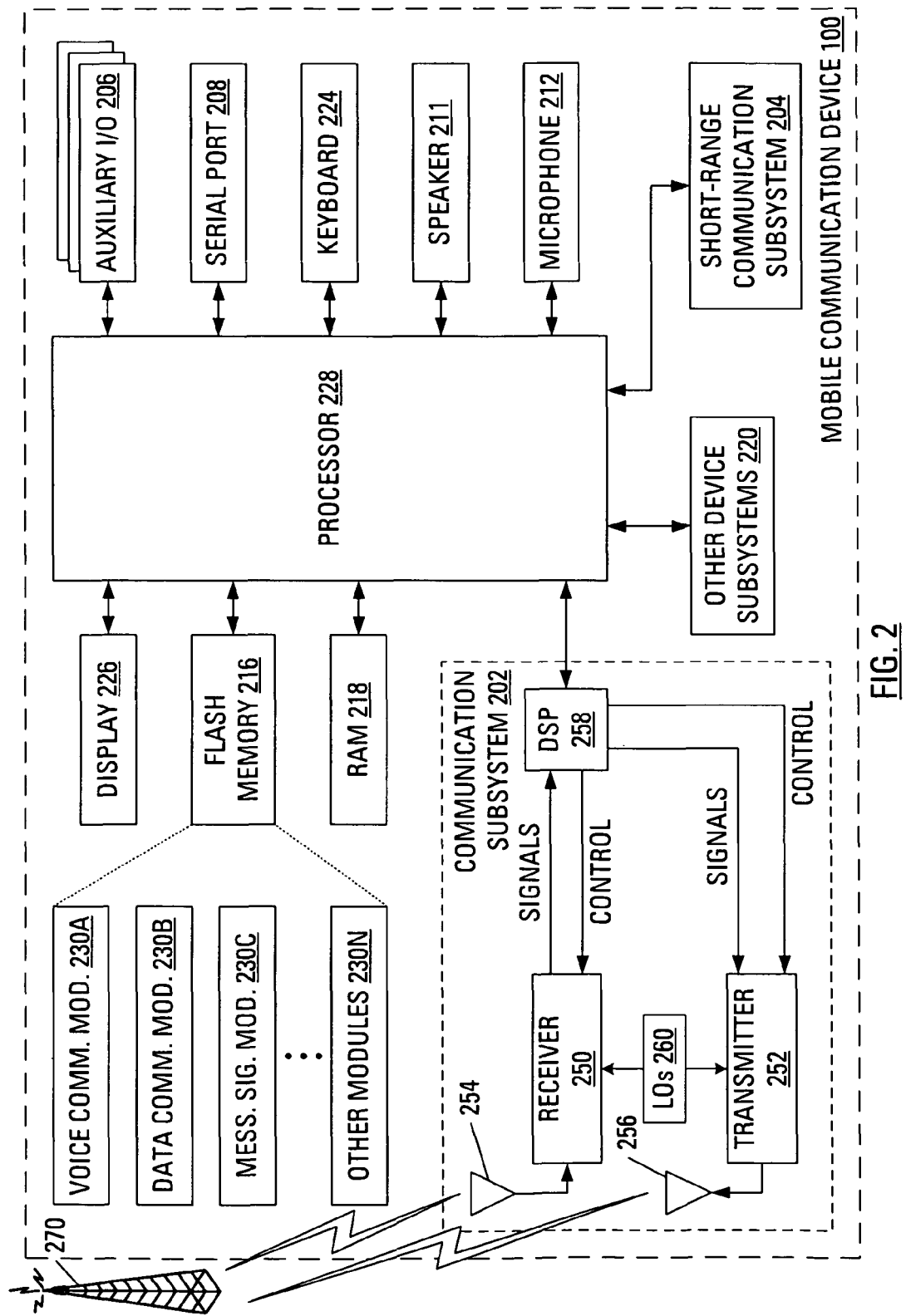
FIG. 2 illustrates a schematic representation of components of the mobile communication device of FIG. 1.

FIG. 2 illustrates the mobile communication device 100. The mobile communication device 100 includes a housing, an input device (e.g., a keyboard 224 having a plurality of keys) and an output device (e.g., a display 226), which may be a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a processor 228) is shown schematically in FIG. 2 as coupled between the keyboard 224 and the display 226. The processor 228 controls the operation of the display 226, as well as the overall operation of the mobile communication device 100, in part, responsive to actuation of the keys on the keyboard 224 by a user. Notably, the keyboard 224 may comprise physical buttons (keys) or, where the display 226 is a touchscreen device, the keyboard 224 may be implemented, at least in part, as "soft keys". Actuation of a so-called soft key involves either touching the display 226 where the soft key is displayed or actuating a physical button in proximity to an indication, on the display 226, of a temporary action associated with the physical button.

The housing may be elongated vertically, or may take on other sizes and shapes (including clamshell housing structures). Where the keyboard 224 includes keys that are associated with at least one alphabetic character and at least one numeric character, the keyboard 224 may include a mode selection key, or other hardware or software, for switching between alphabetic entry and numeric entry.

In addition to the processor 228, other parts of the mobile communication device 100 are shown schematically in FIG. 2. These may include a communications subsystem 202, a short-range communications subsystem 204, the keyboard 224 and the display 226. The mobile communication device 100 may further include other input/output devices, such as a set of auxiliary I/O devices 206, a serial port 208, a speaker 211 and a microphone 212. The mobile communication device 100 may further include memory devices including a flash memory 216 and a Random Access Memory (RAM) 218 and various other device subsystems 220. The mobile communication device 100 may comprise a two-way radio frequency (RF) communication device having voice and data communication capabilities. In addition, the mobile communication device 100 may have the capability to communicate with other computer systems via the Internet.

Operating system software executed by the processor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The processor 228, in addition to its operating system functions, enables execution of software applications on the mobile communication device 100. A predetermined set of software applications that control basic device operations, such as a voice communications module 230A and a data communications module 230B, may be installed on the mobile communication device 100 during manufacture. A message signing module 230C may also be installed on the mobile communication device 100 during manufacture, to implement aspects of the present disclosure. As well, additional software modules, illustrated as an other software module 230N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 270 represented by a radio tower. The data items managed by the PIM application may be seamlessly integrated, synchronized and updated via the wireless carrier network 270 with the device user's corresponding data items stored or associated with a host computer system.

Communication functions, including data and voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the mobile communication device 100 is intended to operate. For example, the communication subsystem 202 of the mobile communication device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 100 may send and receive communication signals over the wireless carrier network 270. Signals received from the wireless carrier network 270 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 270 are processed (e.g., modulated and encoded) by the DSP 258 and are then provided to the transmitter 252 for digital to analog conversion, frequency up conversion, filtering, amplification and transmission to the wireless carrier network 270 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the processor 228. The received signal is then further processed by the processor 228 for output to the display 226, or alternatively to some auxiliary I/O devices 206. A device user may also compose data items, such as e-mail messages, using the keyboard 224 and/or some other auxiliary I/O device 206, such as a touchpad, a rocker switch, a thumb-wheel, a trackball, a touchscreen, or some other type of input device. The composed data items may then be transmitted over the wireless carrier network 270 via the communication subsystem 202.

In a voice communication mode, overall operation of the device is substantially similar to the data communication mode, except that received signals are output to the speaker 211, and signals for transmission are generated by a microphone 212. Alternative voice or audio I/O subsystems, such as a voice message recording subsystem, may also be implemented on the mobile communication device 100. In addition, the display 226 may also be utilized in voice communication mode, for example, to display the identity of a calling party, the duration of a voice call, or other voice call related information.

The short-range communications subsystem 204 enables communication between the mobile communication device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

In overview, the mobile communication device 100 receives an initial portion of a first e-mail message from the wireless mail server 118, where the first e-mail message has originated at the representative message origin 130. The user of the mobile communication device 100 manipulates the mobile communication device 100 to invoke a message composition user interface preloaded with the received initial portion of the first e-mail message and composes a new portion. Where the user has specified that the message is to be processed (e.g., signed and/or encrypted), responsive to the user indicating that the message is to be sent, aspects of the present disclosure allow for the processing of a new message that includes the new portion and the entirety of the first e-mail message.

For example, the message composition user interface may allow the user to specify that the message is to be signed. Typically, when the user has indicated that the message is to be sent, the message composition user interface prompts the user for a password associated with a key store in which the private cryptographic key 124 is stored. Upon verifying a received password, the processor 228 executes a message signing algorithm to generate a signature by, first, generating a hash of the message and, second, encrypting the hash with the private cryptographic key 124.

In a first cross-component message processing approach, some automation is provided to the complex operations. Responsive to the user indicating that a reply message with truncated original message is to be sent, it is proposed herein to prompt the user with a dialog that includes a user option to "Download Original". Responsive to receiving an indication that the "Download Original" user option has been selected, the processor 228 may automatically download the remainder of the original message and append the remainder of the original message to the reply message. The processor 228 may then sign, encrypt or sign and encrypt the reply message with the entire original message before sending, thereby providing full, end-to-end security.

Figure 3:
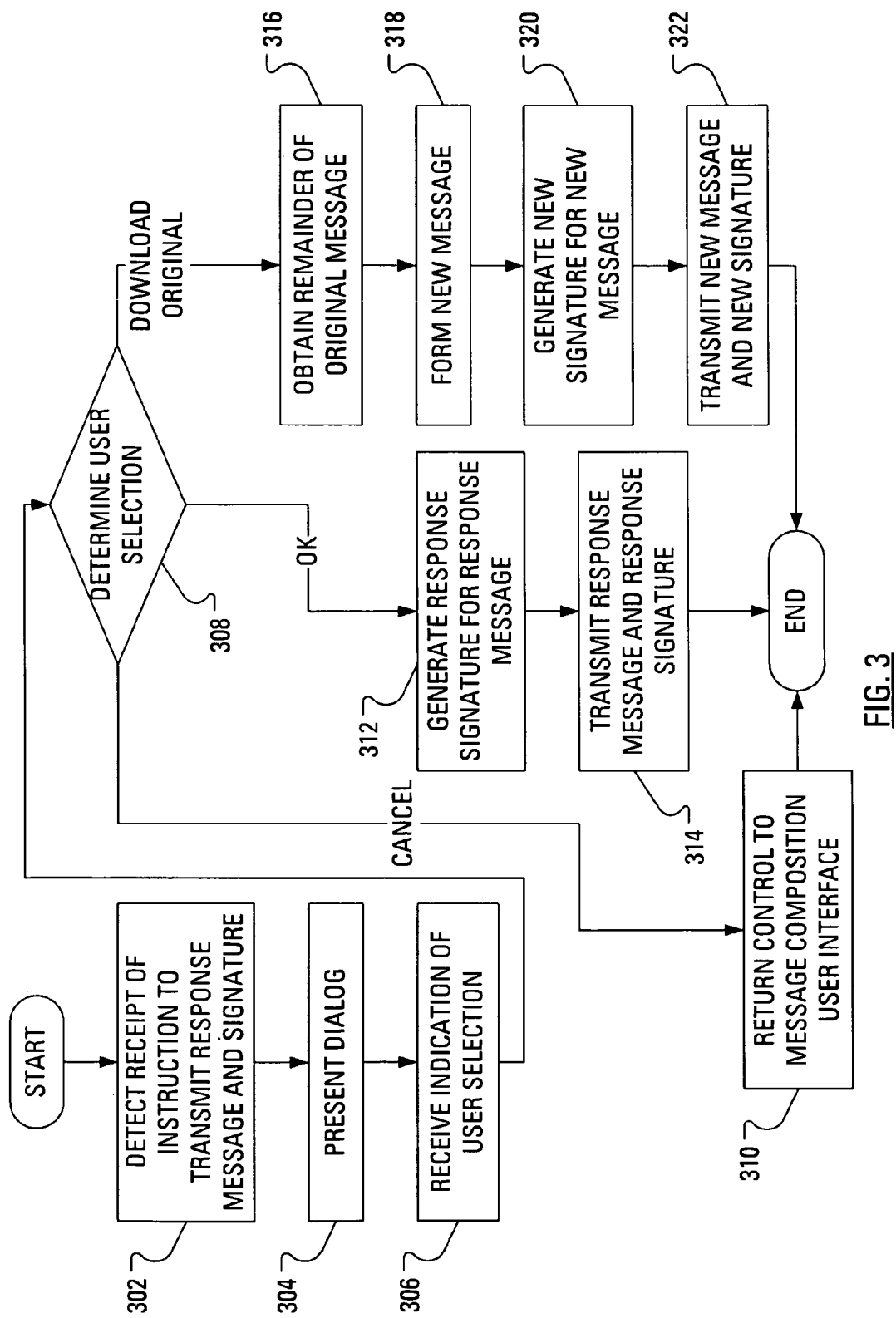
FIG. 3 illustrates example steps in a first method of processing an electronic message at the mobile communication device of FIG. 1, where the processing comprises signing.

Steps of a method that is an example of a first cross-component message signing approach are presented in FIG. 3. Initially, the processor 228, or, more accurately, a signature handling application executed on the processor 228, detects receipt (step 302) of an instruction to transmit a response message and an associated signature. Such an instruction may be received from the message composition user interface application also executed on the processor 228.

From the user's perspective, the user has specified that the response message is to be signed and the user has composed the new portion of the response message (in any order). The user may have configured the mobile communication device 100, at some earlier time, to, by default, transmit an associated signature with each outgoing messages. The receipt (detected in step 302), by the signature handling application, of the instruction to transmit a response message and an associated signature may be triggered by the user opening a menu and selecting a "send" menu item.

Figure 4:
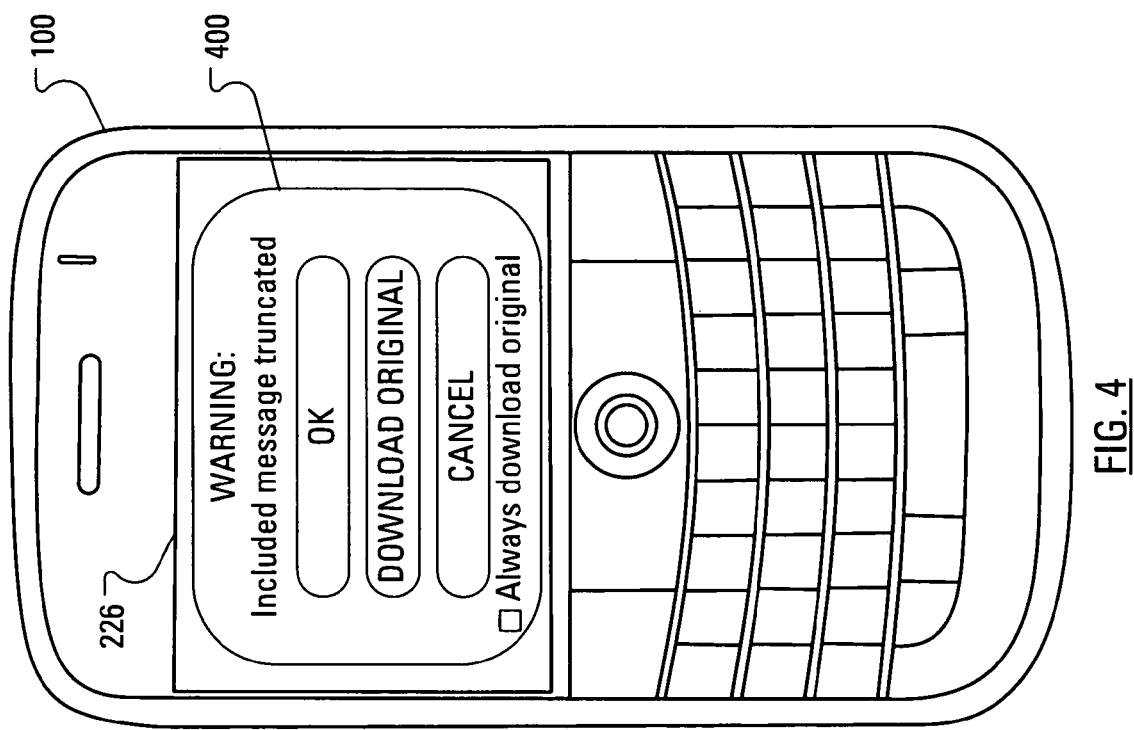
FIG. 4 illustrates an example dialog to warn a user that an e-mail message will be incompletely included in a response message.

Responsive to the detection in step 302, the signature handling application may present (step 304) a dialog to warn the user that the first e-mail message will be incompletely included in the response message and giving the user choice regarding how or whether to proceed. An example of a suitable dialog is illustrated as a dialog 400 in FIG. 4. The dialog 400 is illustrated as being displayed on the display 226 of the mobile communication device 100.

As has been discussed above, the dialog 400 may include choices labeled "OK" and "Cancel". Furthermore, according to an aspect of the present disclosure, the dialog 400 may include another choice, labeled "Download Original".

It is expected that the user of the mobile communication device 100 will interact with the dialog 400 to select one of the choices. Accordingly, the signature handling application may receive (step 306) an indication of the user selection and determine (step 308) which of the choices the user has selected. Upon determining (step 308) that the user has selected the "Cancel" choice, the signature handling application may return (step 310) control to the message composition user interface.

Upon determining (step 308) that the user has selected the "OK" choice, the signature handling application may generate (step 312) a signature for the response message. To distinguish this signature from an alternative signature to be discussed hereinafter, this signature may be termed a "response" signature. The response signature is a result of encrypting a hash of the response message, where the response message includes the new portion, recently composed by the user of the mobile communication device 100, and the initial portion of the first e-mail message (i.e., not the entire first e-mail message). The signature handling application may then arrange the transmission (step 314) of the response message and the response signature.

Upon determining (step 308) that the user has selected the "Download Original" choice, the signature handling application may obtain (step 316) the remainder of the first e-mail message from the wireless mail server 118 and form (step 318) a "new" message. The new message may be formed from the new portion, recently composed by the user of the mobile communication device 100, and the entirety of the first e-mail message, obtained in step 316. The signature handling application may then generate (step 320) a signature for the new message. To distinguish this signature from the "response" signature, this signature may be termed a "new" signature. The new signature is a result of encrypting a hash of the new message. The signature handling application may then arrange the transmission (step 322) of the new message and the new signature.

Additionally, the warning dialog 400 may include a checkbox labeled "Always download original". By selecting the checkbox labeled "Always download original" and then selecting the "Download Original" choice, the user may effectively set a policy for the mobile wireless device, where the policy indicates that all future signed, and/or encrypted, messages are to include the entirety of the original received message.

As a further alternative, the dialog 400 may include a checkbox labeled "Always send truncated" (not shown). By selecting the checkbox labeled "Always send truncated" (not shown) and then selecting the "OK" choice, the user may effectively set a policy for the mobile wireless device, where the policy indicates that all future signed, and/or encrypted, messages are to include only a truncated version of the original received message.

Apart from the dialog 400, the user may be provided with an opportunity to establish a policy through editing a policy through use of a configuration options user interface. Such a configuration options user interface may allow the user to specify a size threshold for the original message so that an original message exceeding the size threshold is not automatically downloaded in its entirety for inclusion in the new message.

Notably, the automatic downloading of the original message may be accomplished on a background thread so that the user does not have to wait for the original message to be downloaded before carrying out further activities on the mobile communication device 100. Responsive to indicating that the message is to be sent, the user may be prompted for a signing password, but the cryptographic key, for encrypting a hash of the new message, would not be used until after the original message has been downloaded.

Notably, the original message may not always be downloaded immediately. The mobile communication device 100 makes use of a data network connection to download the original message. Accordingly, in the absence of a data network connection, the mobile communication device 100 waits until a data network connection has been established, before downloading the original message.

Figure 5:
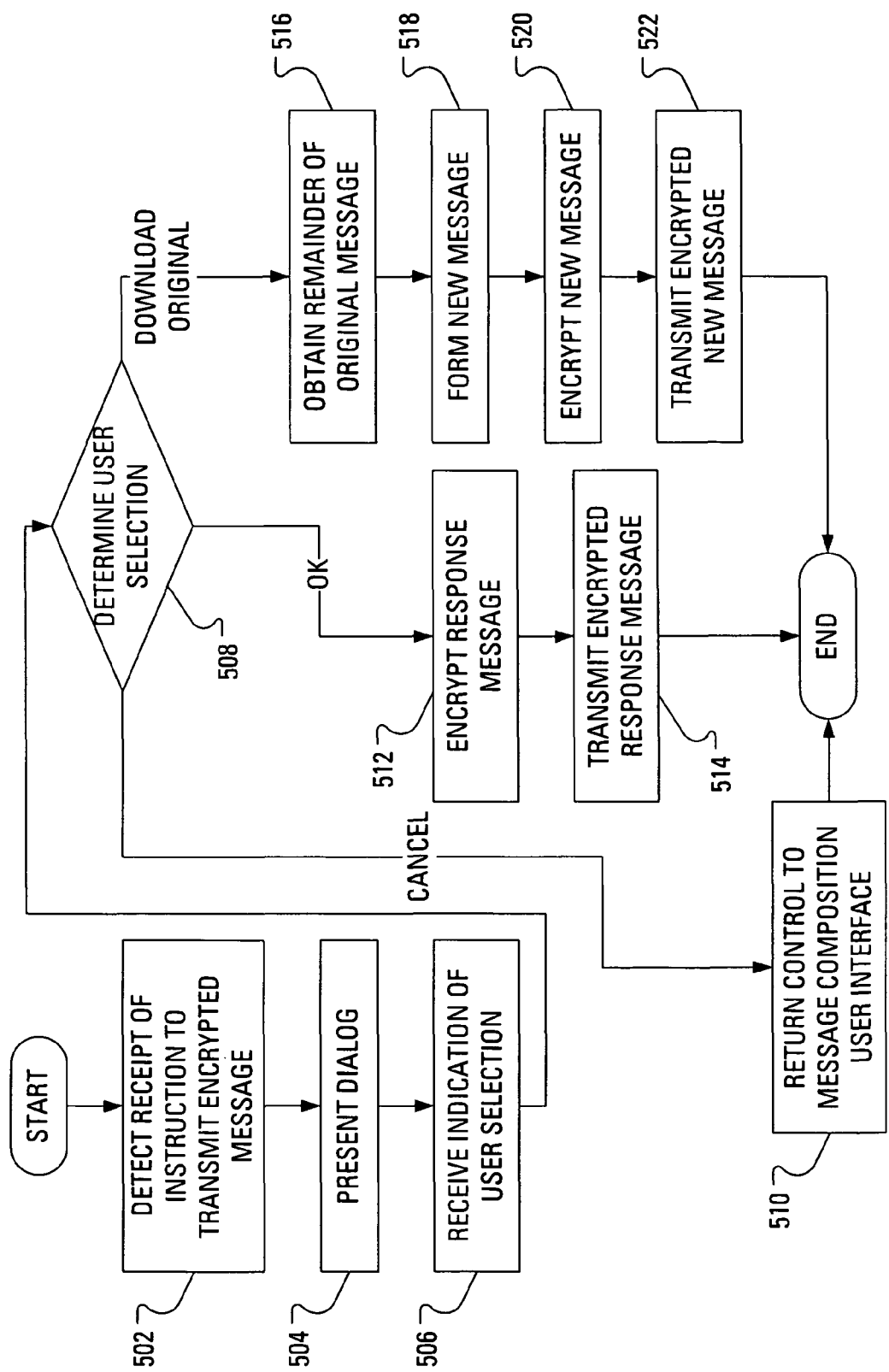
FIG. 5 illustrates example steps in the method of FIG. 3, where the processing comprises encrypting.

The first cross-component message signing approach may be adapted for message encryption instead of, or in addition to, message signing. Steps of a method that is an example of adapting the first cross-component message signing approach to encryption are presented in FIG. 5. Initially, the processor 228, or, more accurately, an encryption handling application executed on the processor 228, detects receipt (step 502) of an instruction to transmit an encrypted response message. Such an instruction may be received from the message composition user interface application also executed on the processor 228.

From the user's perspective, the user has specified that the response message is to be encrypted and the user has composed the new portion of the response message (in any order). The user may have configured the mobile communication device 100, at some earlier time, to, by default, encrypt each outgoing messages. The receipt (detected in step 502), by the encryption handling application, of the instruction to transmit an encrypted version of the response message may be triggered by the user opening a menu and selecting a "send" menu item.

Responsive to the detection in step 502, the encryption handling application may present (step 504) a dialog to warn the user that the first e-mail message will be incompletely included in the response message and giving the user choice regarding how or whether to proceed. An example of a suitable dialog is illustrated as a dialog 400 in FIG. 4. The dialog 400 is illustrated as being displayed on the display 226 of the mobile communication device 100.

As has been discussed above, the dialog 400 may include choices labeled "OK" and "Cancel". Furthermore, the dialog 400 may include another choice, labeled "Download Original".

It is expected that the user of the mobile communication device 100 will interact with the dialog 400 to select one of the choices. Accordingly, the encryption handling application may receive (step 506) an indication of the user selection and determine (step 508) which of the choices the user has selected. Upon determining (step 508) that the user has selected the "Cancel" choice, the encryption handling application may return (step 510) control to the message composition user interface.

Upon determining (step 508) that the user has selected the "OK" choice, the encryption handling application may encrypt (step 512) the response message. The encryption handling application may then arrange the transmission (step 514) of the encrypted response message.

Upon determining (step 508) that the user has selected the "Download Original" choice, the encryption handling application may obtain (step 516) the remainder of the first e-mail message from the wireless mail server 118 and form (step 518) a "new" message. The new message may be formed from the new portion, recently composed by the user of the mobile communication device 100, and the entirety of the first e-mail message, obtained in step 516. The encryption handling application may then encrypt (step 520) the new message. The encryption handling application may then arrange the transmission (step 522) of the encrypted new message.

A second cross-component message signing approach involves splitting the signing operation between the mobile communication device 100 and the wireless mail server 118, thereby avoiding the downloading of the original message. Unlike the first approach, this split-signing approach cannot be considered to result in true end-to-end security, because the entire e-mail message is not signed strictly at the mobile communication device 100. Rather, at least the new portion, recently composed by the user of the mobile communication device 100, is signed strictly at the device, and the signing of the entire message, including the remainder not signed strictly at the device, involves the wireless mail server 118. However, this second approach does provide a compromise between security and use of wireless channel resources, which makes it particularly suitable for signing large messages or messages with large attachments.

Figure 6:
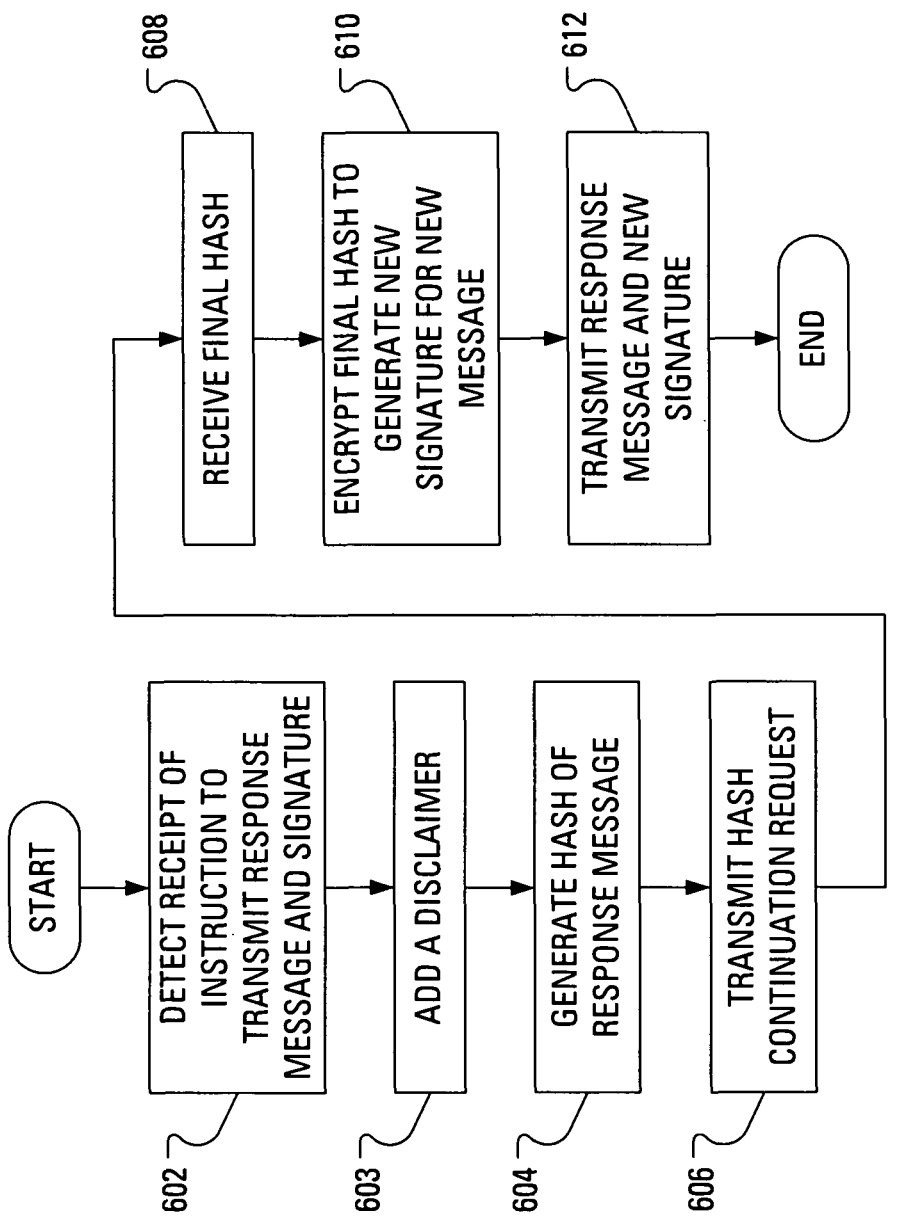
FIG. 6 illustrates example steps in a second method of processing an electronic message at the mobile communication device of FIG. 1, where the processing comprises signing.

Steps of a method that is an example of the second approach are presented in FIG. 6. Initially, the signature handling application detects receipt (step 602) of an instruction to transmit a response message and an associated signature. Such an instruction may be received from the message composition user interface application also executed on the processor 228.

Responsive to the detection in step 602, the signature handling application may automatically add (step 603) a disclaimer to the end of the response message, indicating that this point in the message marks the end of the part of the message signed at the mobile communication device 100 and/or the beginning of the part signed with the assistance of the wireless mail server 118. For example, the disclaimer may be a line of text, such as "—end of device-signed data—". The signature handling application may further obtain (step 604) a hash of the response message, where the response message includes the new portion, recently composed by the user of the mobile communication device 100, and the initial portion of the first e-mail message (i.e., not the entire first e-mail message).

The signature handling application may then arrange the transmission (step 606), to the wireless mail server 118, of a request that the wireless mail server 118 continue the hashing across the first e-mail message. Along with the request, the signature handling application may arrange the transmission of the "context" of the hash of the response message to the wireless mail server 118. The context may be an indication of the internal state of the hashing algorithm. Such an internal state indication may allow the wireless mail server 118 to continue to obtain the hash.

Figure 7:
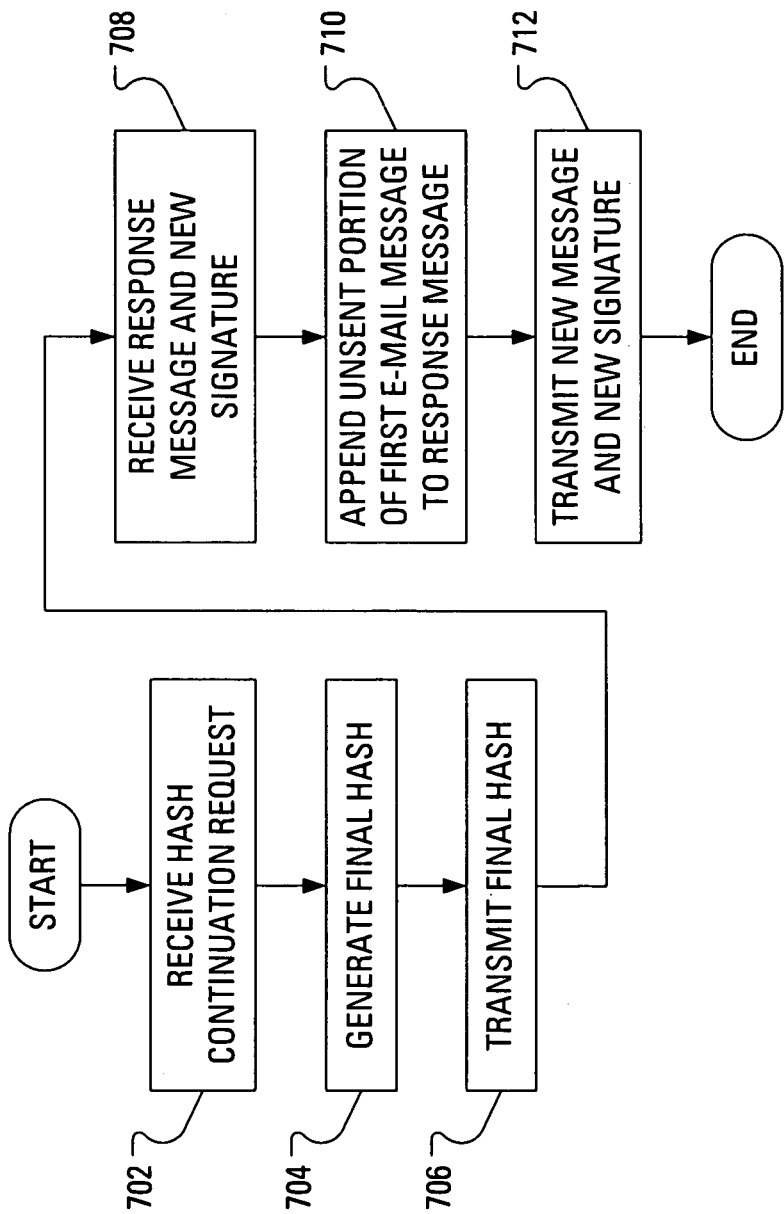
FIG. 7 illustrates example steps in a method of processing an electronic message at the wireless mail server of FIG. 1, in conjunction with the method of FIG. 6.

Steps in an example method of participating, at the wireless mail server 118, in the split signing operation are illustrated in FIG. 7. Initially, the wireless mail server 118 receives (step 702) the hash continuation request. The wireless mail server 118 has awareness of the portion of the first e-mail message that was transmitted to the mobile communication device 100 and can therefore generate (step 704) a "final" hash by hashing the portion of the first e-mail message that has not been transmitted to the mobile communication device 100, where the final hash is a hash of a "new" message. The new message includes the new portion, recently composed by the user of the mobile communication device 100, and the entirety of the first e-mail message.

Alternatively, if the hashing algorithm is a "streaming" algorithm, the mobile communication device 100 may transmit, to the wireless mail server 118, the current value of the hash.

Upon completing generation (step 704) of the hash across the first e-mail message, the wireless mail server 118 transmits (step 706) the final hash to the mobile communication device 100. It should be clear that the final hash is likely to be significantly smaller than the remainder of the original message.

Upon receiving (step 608) the final hash from the wireless mail server 118, the mobile communication device 100 encrypts (step 610) the final hash and arranges (step 612) the transmission of the response message and the encrypted hash to the wireless mail server 118. The encrypted hash may be called the new signature.

Upon receiving (step 708) the response message and the new signature, the wireless mail server 118 constructs the new message by appending (step 710) the portion of the first e-mail message that has not been transmitted to the mobile communication device 100 to the response message and transmits (step 712) the new message and the new signature.

Since the second cross-component message signing approach represented by the methods of FIGS. 6 and 7 may not be considered to result in true, end-to-end security, the user may be provided with an opportunity to select the second cross-component message signing approach on a per-message basis, depending on the size of the data and/or security requirements.

In a third cross-component message signing approach, the entire hash is generated on the wireless mail server 118. The user composes the new portion and indicates that the response message and an associated signature are to be sent.

Figure 8:
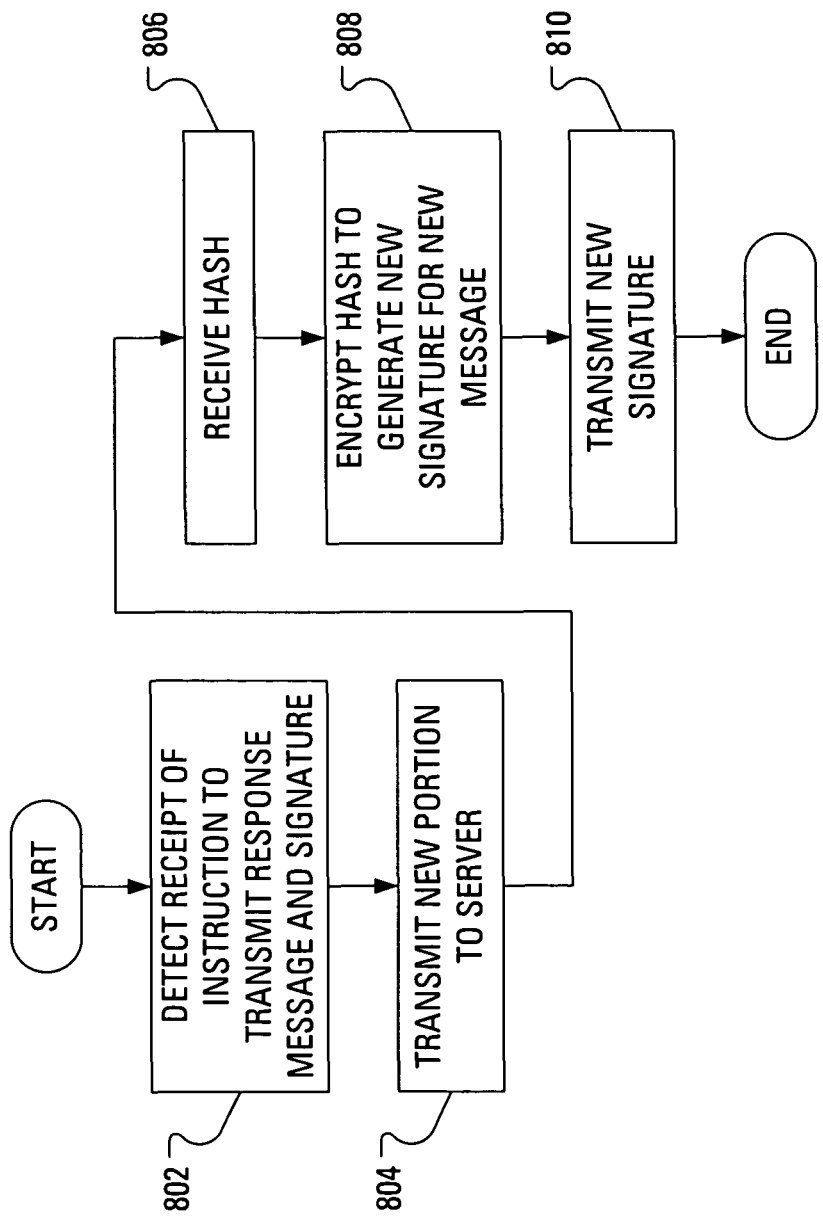
FIG. 8 illustrates example steps in a third method of processing an electronic message at the mobile communication device of FIG. 1, where the processing comprises signing.

Steps of a method that is an example of the third cross-component message signing approach are presented in FIG. 8. Initially, the signature handling application at the mobile communication device 100 detects receipt (step 802) of an instruction to transmit the response message and the associated signature.

Responsive to the detection in step 802, the signature handling application may arrange (step 804) transmission of the new portion to the wireless mail server 118.

Figure 9:
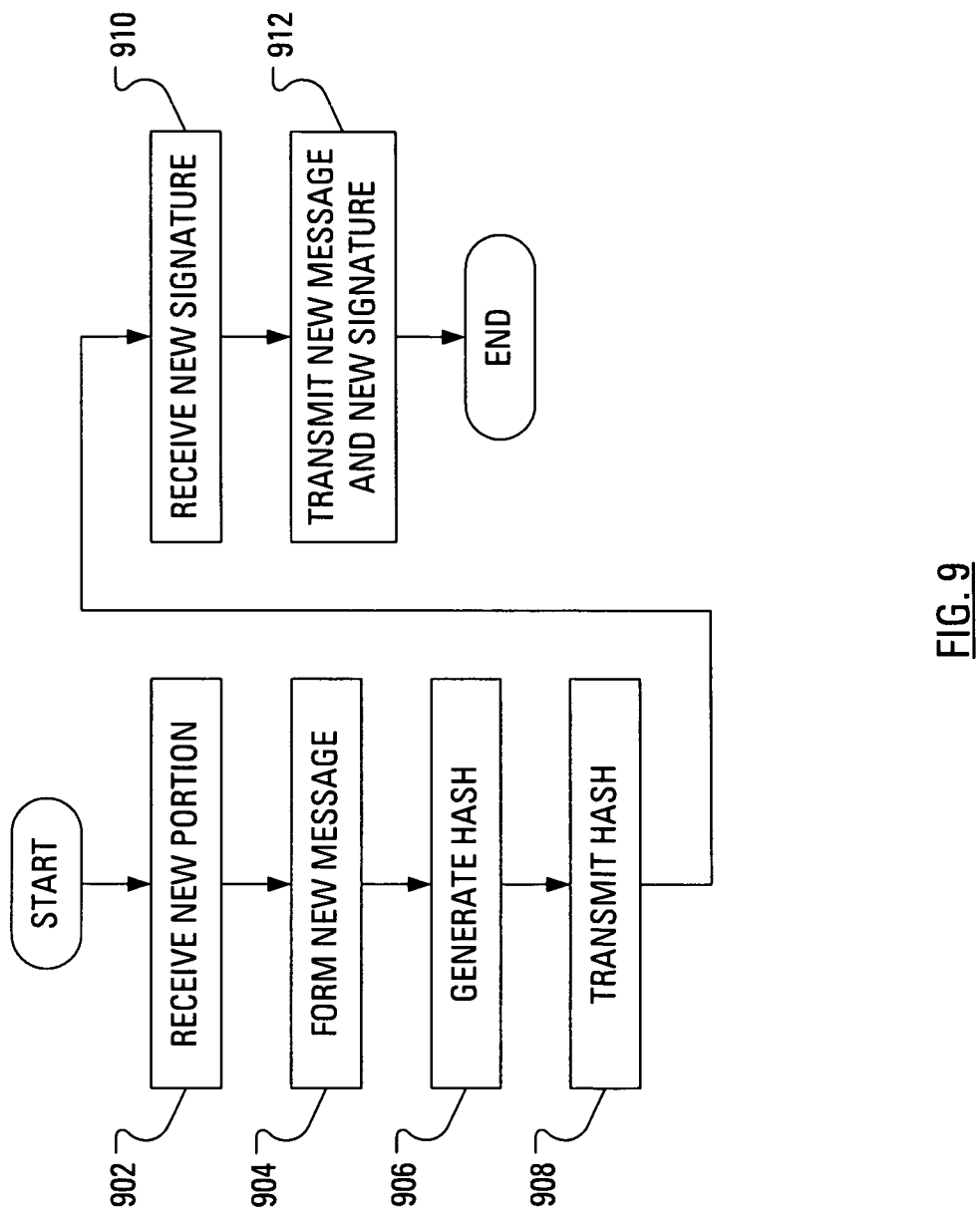
FIG. 9 illustrates example steps in a method of processing an electronic message at the wireless mail server of FIG. 1, in conjunction with the method of FIG. 8.

Steps in an example method of participating, at the wireless mail server 118, in the third cross-component message signing approach are illustrated in FIG. 9. Initially, the wireless mail server 118 receives (step 902) the new portion and appends the first e-mail message to the new portion, thereby forming (step 904) the new message. The wireless mail server 118 then generates (step 906) a hash of the new message. The wireless mail server 118 transmits (step 908) the hash to the mobile communication device 100.

At the mobile communication device 100, the signature handling application receives (step 806) the hash and encrypts (step 808) the hash to generate the new signature. The signature handling application then arranges (step 810) the transmission of the new signature to the wireless mail server 118.

Upon receipt (step 910) of the new signature, the wireless mail server 118 transmits (step 912) the new message and the new signature.

Message security in the third cross-component message signing approach may be considered to be less "end-to-end" than the second cross-component message signing approach and the third cross-component message signing approach does not appear to provide additional bandwidth-usage enhancements over the second cross-component message signing approach. Accordingly, the third cross-component message signing approach may be considered less desirable than the second cross-component message signing approach.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A mobile wireless communication device comprising:
a processor adapted to:
  detect receipt of an instruction to sign a response message, where said response message includes a new portion and a truncated portion of a preceding message;
  amend said response message to include a disclaimer, thereby producing an amended response message, said disclaimer marking an end of a part of the message signed at said mobile wireless communication device;
  generate, using a hashing algorithm and based on said amended response message, a primary hash;
  transmit a processing request to a server associated with said mobile wireless communication device, said request including a context for said hashing algorithm;
  receive, from said server, a secondary hash;
  encrypt said secondary hash to form a digital signature;
  transmit said amended response message to said server; and
  transmit said digital signature to said server associated with said amended response message.

2. A non-transitory computer-readable storage medium containing computer-executable instructions that, when performed by a processor for a mobile wireless communication device, cause said processor to:

detect receipt of an instruction to sign a response message, where said response message includes a new portion and a truncated portion of a preceding message;

amend said response message to include a disclaimer, thereby producing an amended response message, said disclaimer marking an end of a part of the message signed at said mobile wireless communication device;

generate, using a hashing algorithm and based on said amended response message, a primary hash;

transmit a processing request to a server associated with said mobile wireless communication device, said request including a context for said hashing algorithm;

receive, from said server, a secondary hash;

encrypt said secondary hash to form a digital signature;

transmit said amended response message to said server; and transmit said digital signature to said server associated with said amended response message.

3. At a mobile wireless communication device, a method of processing an electronic message, said method comprising:

detecting receipt of an instruction to sign a response message, where said response message includes a new portion and a truncated portion of a preceding message;

responsive to said detecting, amending said response message to include a disclaimer, thereby producing an amended response message, said disclaimer marking an end of a part of the message signed at said mobile wireless communication device;

generating, using a hashing algorithm and based on said amended response message, a primary hash;

transmitting a processing request to a server associated with said mobile wireless communication device, said request including a context for said hashing algorithm;

receiving, from said server, a secondary hash;

encrypting said secondary hash to form a digital signature;

transmitting said amended response message to said server; and transmitting said digital signature to said server associated with said amended response message.

4. The method of claim 3 wherein said disclaimer comprises the text "—end of device-signed data—".

* * * * *